United States Patent [19]

Huggins

[11] Patent Number: 6,054,506

[45] Date of Patent: Apr. 25, 2000

[54] THERMOPLASTIC MOLDING COMPOSITIONS, PREPARATION AND USE THEREOF AND PROCESS FOR THE PRODUCTION OF MOLDED ARTICLES FROM CERAMIC POWDERS

[75] Inventor: John Huggins, Leverkusen, Germany

[73] Assignee: GE Bayer Silicones GmbH & Co., Erkrath, Germany

[21] Appl. No.: 09/104,906

[22] Filed: Jun. 25, 1998

[30] Foreign Application Priority Data

Jun. 30, 1997 [DE] Germany .............................. 192 27 706

[51] Int. Cl.⁷ ....................................................... C08K 9/00
[52] U.S. Cl. ................................................................ 523/200
[58] Field of Search ................................................. 523/200

[56] References Cited

U.S. PATENT DOCUMENTS 5,491,181  2/1996  Huggins .................................. 523/200

*Primary Examiner*—Paul R. Michl
*Attorney, Agent, or Firm*—Norris, McLaughlin & Marcus

[57] ABSTRACT

Thermoplastic molding compositions containing at least one coated ceramic powder and at least one thermoplastic binding agent or binding-agent mixture process for the preparation thereof, use thereof and process for the production of molded articles from ceramic powders.

8 Claims, No Drawings

THERMOPLASTIC MOLDING COMPOSITIONS, PREPARATION AND USE THEREOF AND PROCESS FOR THE PRODUCTION OF MOLDED ARTICLES FROM CERAMIC POWDERS

The present invention relates to new thermoplastic molding compositions containing at least one coated ceramic powder and at least one thermoplastic binding agent or binding-agent mixture, to a process for the preparation thereof and the use thereof and also to a process for the production of molded articles from ceramic powders.

Thermoplastic molding compositions find application, inter alia, in processes such as thermoplastic injection molding, for example, in which temperature-dependent flow behavior is necessary.

It is known that sinterable ceramic powders can be mixed together with thermoplastic binding agents to form molding compositions and can be processed to form molded articles by means of processes such as injection molding (Inter. J. High Technology Ceramics 2 (1986) 1–31).

Subsequent to the shaping the binding agent is removed from the molded article. This is effected at temperatures between 100 and 800° C. either in air or in an inert atmosphere at excess pressure, normal pressure or in a vacuum. The binding agent is generally removed in air at normal pressure. Furthermore, the binding agent may be partially or totally removed by extraction with solvent or super-critical gases.

Subsequently the molded article which is partially or totally freed of binding agent is sintered, as a rule at temperatures of more than 800° C., whereby a partial or total compression of the body takes place.

In order to obtain flawless sintered molded articles the molding compositions have to possess a content of ceramic powder that is as high as possible, preferably 60 to 70 vol-%. However, it is generally known that with increasing powder content the viscosity of the molding compositions at the processing temperature also rises. The rise in viscosity in the case of ceramic powders containing clay with average grain sizes of less than 10 μm is particularly pronounced.

The injection molding of molding compositions with high processing viscosities has several disadvantages. Molding compositions of high viscosity are not readily capable of filling complicated or thin-walled molds or molds having long flow paths and require a high injection pressure and holding pressure during injection molding. In this case molded articles having high internal stresses are produced which exhibit flaws after sintering.

In order to eliminate these disadvantages, different thermoplastic binding agents have been employed, such as, for example, low-molecular weight waxes (Am. Ceram. Soc. Bull. 42(1) (1963) 13–19) or additives such as fatty acids and also the esters thereof (Ceramic Eng. Sci. Proc. 3 (1982) 20–34). According to U.S. Pat. No. 4,898,902 use is made of saturated or unsaturated fatty acids having 4 to 30 carbon atoms, the methyl, butyl or sorbitan esters thereof and also the calcium, magnesium or aluminium salts thereof.

U.S. Pat. No. 5,491,181 describes the use of ceramic powders coated with ionic dis-persants based on organophosphorus for the preparation of low-viscosity injection-molding compositions. These coated ceramic powders are prepared by blending an aqueous solution of the dispersant with a suspension of the powder in water and subsequent drying, for example by spray drying. The preferred dispersants are the monovalent salts of organo-modified phosphoric esters, phosphonic acids and phosphonobutanetricarboxylic acids. The preferred dispersants are modified with $C_4$ to $C_{22}$ alkyl groups.

The dispersants described in U.S. Pat. No. 5,491,181 have the disadvantage that the salts are only slightly soluble in water. Aqueous solutions are not possible with more than 5% of these dispersants modified with $C_5$ or higher alkyl groups. Therefore large quantities of water have to be employed during the preparation of the coated ceramic powders, making large-scale preparation by means of spray drying uneconomical.

It was therefore the object of the present invention to provide new thermoplastic molding compositions with high powder content and low processing viscosity that do not exhibit the disadvantages of the state of the art.

It has now been found that certain ceramic powders coated with polyether-substituted phosphoric esters, phosphonic esters or phosphonocarboxylic esters satisfy this requirement and result in thermoplastic injection-molding compositions of low viscosity. In this connection it is particularly advantageous that the polyether-substituted phosphoric esters, phosphonic esters or phosphonocarboxylic esters are readily soluble in water. Despite high contents of clay-containing ceramic powders, the molding compositions according to the invention still exhibit good processing characteristics. Surprisingly, the viscosity of the molding compositions according to the invention is not only clearly lower than the viscosity of comparable molding compositions consisting of comparable uncoated ceramic powders but also clearly lower than the viscosity of molding compositions consisting of powders coated with other water-soluble dispersants.

In a first embodiment, the present invention is therefore directed to thermoplastic molding compositions containing at least one coated clay-containing ceramic powder and at least one thermoplastic binding agent, wherein the ceramic powder is coated with at least one polyether-substituted phosphoric ester, phosphonic ester, phosphonocarboxylic ester, salts of said esters and combinations thereof.

In addition, the molding composition according to the invention may contain other auxiliary substances such as mold-release aids.

In another embodiment of the present invention, the thermoplastic molding composition preferably contains at least one silicone resin in addition to the coated clay-containing ceramic powder and the thermoplastic binding agent.

The silicone resins are preferably polyorganosiloxanes that have a multiplybranched structure. Preferred in addition are thermoplastic silicone resins or silicone-resin mixtures with a softening temperature between 30 and 200° C., in particular between 40 and 130° C. Particularly preferred are thermoplastic silicone resins that present a ceramic yield (defined as the residue after pyrolysis up to 1,000° C. in contact with the air) of at least 70 wt-%. The preferred thermoplastic silicone resin has the average formula

$$R^1{}_a Si(OH)_b(OR^2)_c O_{(4-a-b-c)/2}$$

wherein a is in the range of 0,95 to 1,2 c is in the range of 0 to 0,2 the sum of a+b+c is 1,05 to 1,5 the sum of b+c is at most 0,3

$R^1$ denotes methyl and $R^2$ denotes a $C_1$ to $C_{18}$ alkyl group

The preferred thermoplastic resin consists of the following units

| from 80 to 95 mol % | $CH_3SiO_{3/2}$ units, |
| from 0 to 20 mol % | $(CH_3)_2SiO_{2/2}$ units and |
| from 0 to 10 mol % | $(CH_3)_3SiO_{1/2}$ units. |

The polyether-substituted phosphoric esters, phosphonic esters or phosphonocarboxylic esters (in the following also called dispersants) may be ionic esters and non-ionic esters or combinations of ionic and non-ionic esters. Preferred in this regard are all phosphoric esters, phosphonic esters or phosphonocarboxylic esters and salts thereof that comprise at least one polyether-substituted ester group and at least one $C_4$ to $C_{40}$ aliphatic group.

The preferred polyether-substituted phosphoric esters, phosphonic esters or phosphonocarboxylic esters contain at least one ester group based on ethyleneoxide, propyleneoxide or mixtures thereof, of the general formula $$—(OCHR^1CH_2)_n—OR^2$$

wherein n is 1 to 20

$R^1$ is H or $CH_3$ and $R^1$ is a straight-chain or branched aliphatic group with 4 to 22 carbon atoms.

The preferred aliphatic group may also contain heteroatoms such as, for example, ether, keto or hydroxyl groups, and also carbon-carbon multiple bonds. Examples are 2-ethylhexyl, nonyl, decyl, isodecyl, oleyl and octadecyl residues.

The preferred phosphoric esters, phosphonic esters or phosphonocarboxylic esters according to the invention comprise at least one acidic function or at least one neutralized acidic function on the phosphorus. The neutralized acidic function may be present in the form of an alkali salt or alkaline-earth salt or alternatively ammonium salt.

Neutralization of the acidic function may be effected both in the course of coating of the powder in water by reaction with water-soluble bases and by reaction of the acid with basic groups of the ceramic powders.

In a preferred embodiment of the present invention the polyether-substituted phosphoric ester has the formula $$(A^+O^-)_a(HO)_bP(O)[(OCHR^1CH_2)_dOR^2]_c$$

in which a ranges from 0 to 2.0 b ranges from 0 to 2.0 c ranges from 1.0 to 2.0 a+b ranges from 1.0 to 2.0, a+b+c=3.0, d is 1 to 20, $A^+$ is $H^+$ or a alkali metal, alkaline metal or ammonium cation, $R^1$ is H or a methyl group and $R^2$ is a straight-chain or branched aliphatic group with 4 to 22 C atoms.

Examples of the dispersants according to the invention are $(HO)_2P(O)[(OCH_4CH_2)_4OC_4H_9)]$
$(HO)P(O)[(OCH_2CH_2)_4OC_4H_9)]_2$
$(HO)_2P(O)[(OCH_2CH_2)_3OC_8H_{17})]$
$(HO)P(O)[(OCH_2CH_2)_3OC_8H_{17})]_2$
$(HO)_2P(O)[(OCH_2CH_2)_6OC_9H_{19})]$
$(HO)P(O)[(OCH_2CH_2)_6OC_9H^{19})]_2$
$(HO)_2P(O)[(OCH_2CH_2)_6OC_{10}H_{21})]$
$(HO)P(O)[(OCH_2CH_2)_6OC_{10}H_{21})]_2$
$(HO)_2P(O)[(OCH_2CH_2)_{20}OC_{10}H_{21})]$
$(HO)P(O)[(OCH_2CH_2)_{20}OC_{10}H_{21})]_2$
$(HO)_2P(O)[(OCH_2CH_2)_6OC_{18}H_{37})]$
$(HO)P(O)[(OCH_2CH_2)_6OC_{18}H_{37})]_2$
$(HO)_2P(O)[(OCH_2CH_2)_{11}OC_{18}H_{37})]$
$(HO)P(O)[(OCH_2CH_2)_{11}OC_{18}H_{37})]_2$ and their neutral salts with alkali metal, alkaline metal or ammonium cations and combinations thereof. The polyether-substituted phosphoric esters are commercially available products such as, for example, those sold under the trade names Servoxyl® from Servo Delden, Delden NL, and Marlophor® from the Hüils AG, Marl, Germany.

In another preferred embodiment the polyether-substituted phosphonic ester has the formula $$(A^+O^-)_aP(O)[(OCHR^1CH_2)_bOR^2]_c(R^3)$$

in which a ranges from 1.0 to 1.5, c ranges from 0.5 to 1.0 a+c=2.0, b is 1 to 20, $A^+$ is $H^+$ or a alkali metal, alkaline metal or ammonium cation, $R^1$ is H or a methyl group, $R^2$ is a straight-chain or branched aliphatic group with 4 to 22 C atoms and $R^3$ is a straight-chain or branched aliphatic group with 1 to 22 C atoms.

In another preferred embodiment the polyether-substituted phosphonocarboxylic ester has the formula

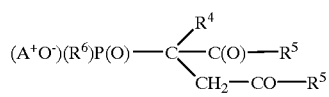

in which $A^+$ is $H^+$ or alkali metal, alkaline metal or ammonium cation, $R^4$ is H or a straight-chain or branched, optionally substituted alkyl residue with 1 to 22 C atoms and $R^5$ is a polyether-substituted ester group of the general formula $$—[(OCHR^1CH_2)_bOR^2]$$

b is 1 to 20, $R^1$ has the meaning given above, $R^2$ has the meaning given above $R^6$ is —OH or $R^5$.

The polyether-modified phosphonic esters, phosphonocarboxylic esters and/or the salts thereof can be obtained via the esterification of the known phosphonic acids or phosphonocarboxylic acids with polyether alcohols in accordance with Ullmann's Encyclopedia of Industrial Chemistry, 5th Ed., Vol. A19, pages 559–563.

The preferred ceramic powder is any clay containing ceramic powder or powder mixture, such as those commonly used for the production of porcelain, bone china, stoneware, earthenware or other silicate ceramic products. These powders are well-known and as a rule contain mixtures of various mineral or synthetic raw materials. The preferred ceramic powders contain 10 to 60% clay, the remainder being quartz, feldspar and bone ash. The clay content may consist of any of the known layered silicates such as kaolinite or smectite clays. The ceramic powders preferably contain uncalcined clays but may also contain calcined clays as well as chamotte or ground porcelain or by-products of production. The preferred average particle size of the ceramic powder mixture is in the range of 2 to 12 μm.

The molding composition according to the invention may also additionally contain uncoated ceramic powders. In a particularly preferred embodiment the molding composition additionally contains uncoated calcined clay, bone ash, calcined porcelain or ground porcelain or chamotte.

The preferred binding agents are mixtures of thermoplastic polymers, waxes and auxiliary agents. Preferred are binding agents that, in the mixture, have a softening temperature between 40 and 200° C. Particularly preferred is a softening temperature between 50 and 150° C. The preferred thermoplastic polymers may be any of the well-known polymers and copolymers based upon styrene, ethylene, propylene, vinylacetate, as well as acrylates and polyesters, commonly used in thermoplastic molding applications. The preferred thermoplastic polymers have a weight average molecular weight of 2,000 to 1,000,000 and a melt viscosity of 1,000 to 20,000,000 mPa.s. The thermoplastic binding agent may contain 0 to 95% thermoplastic polymer, preferably 5 to 50% thermoplastic polymer.

The preferred thermoplastic binding agent can contain one of more wax components with a softening temperature between 50 and 150° C. and a melt viscosity of less than 1000 mPa.s. Both synthetic waxes and waxes of mineral or natural origin, such as paraffin wax, montan wax, beeswax or vegetable waxes. Examples of preferred synthetic waxes are Fischer-Tropsch waxes, polyethylene waxes and ethylen/vinylacetate copolymer waxes. Fatty acids and the amids and esters thereof are likewise preferred. The preferred thermoplastic binding agents contain 5 to 100% wax.

The thermoplastic binding agents according to the invention may also contain additional quantities of mold release aids such as, for example, stearic acid, Na, Ca, Mg or Zn stearate in amounts of 0–5% by weight of binding agent.

The composition for commonly used thermoplastic binders for ceramic powders are described in *Powder Injection Molding*, R. M. German, Metall Powder Industries Federation: Princeton, N.J. 1990, pg. 99–124.

The present invention also pertains to a process for the preparation of the thermoplastic molding compositions of the invention, in accordance with which a suspension of at least one ceramic powder in water is mixed with at least one of the polyether-modified phosphonic esters according to the invention, a phosphonic ester, a phosphonocarboxylic ester and/or salts thereof (dispersant) and subsequently dried and, subsequent thereto, blended with thermoplastic binding agent. The dispersant may be used either in the form of an aqueous solution or in undiluted form. The dispersant is preferably employed in quantities from 0.25 to 3.0%, 0.5 to 1.5% being particularly preferred, relative to the dry weight of the powder.

Drying of the suspension may be effected, for example, by spray drying in contact with the air.

In the process according to the invention, auxiliary substances such as liquefiers, for example, may also be admixed to the suspension. Known liquefiers are sodium silicate, polyphosphates and such like.

The thermoplastic molding compositions according to the invention preferably contain, besides the coated ceramic powders, at least as much binding agent, silicone resin and auxiliary substances as is necessary in order to obtain a thermoplastic, processable composition. Depending on the density of the powder and also on the grain shape and grain-size distribution thereof, different quantities are necessary. Experience has shown that 12 to 30 wt.-% binding agent silicone resin and auxiliary substances are necessary. Particularly preferred are molding compositions that contain less than 20% binding agent, silicone resin and auxiliary substances.

The thermoplastic molding compositions according to the invention are preferably prepared by mixing the components at a temperature above the softening temperature of the binding agent. It is advantageous to apply high shear forces during mixing, in order to comminute powder aggregates and thereby to obtain a homogeneous mixture. Suitable mixing units are, for example, kneaders, extruders or rolling mills. The molding compositions may be either used directly or first processed to form powders or granulates.

The thermoplastic molding compositions according to the invention possess excellent properties for thermoplastic shaping, for example by injection molding. Molding compositions that contain coated clay-containing ceramic powder according to the invention are of lower viscosity at the processing temperature than molding compositions that contain uncoated powders. The lower viscosity of the molding compositions according to the invention results in improved processing characteristics, such as lower injection pressure or less abrasion. Alternatively the molding composition according to the invention may contain more ceramic powder for the same viscosity as a molding composition containing uncoated ceramic powder. The necessary shear energy in the course of mixing the molding composition, in an extruder for example, may also be lowered and by this means the throughput may be increased and abrasion may be reduced.

The invention furthermore pertains to a process for the production of ceramic molded bodies by shaping of the molding composition according to the invention, removal of the binding agent by firing in contact with the air and sintering. Firing is preferably effected at between 100 and 600° C.

A further embodiment of the invention is directed to the use of the thermoplastic molding composition according to the invention for the production of ceramic molded articles, particularly of common utensils such as cups, from porcelain, bone china, earthenware or stoneware.

The invention is described further on the basis of the following Examples, without being restricted thereto.

EMBODIMENT EXAMPLES

The following substances were employed in the Examples:

Dispersant A

A neutralized polyether-substituted 50:50 mixture of phosphoric esters of the formula

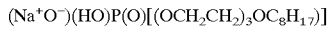

and

Dispersant A was employed in the form of a 50% aqueous solution. The neutralized phosphoric-ester mixture can be obtained in the form of an 85% solution from Servo Delden BV, Delden NL, under the designation Servoxyl VPT 3/85.

Dispersant B

A neutralized polyether-substituted 50:50 mixture of phosphoric esters of the formula

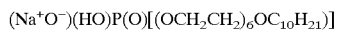

and

Dispersant B was employed in the form of a 25% aqueous solution. The solution was prepared by neutralization of the corresponding acid mixtures with caustic-soda solution in water. The phosphoric-ester mixture can be obtained in the form of a 100% liquid from Servo Delden BV, Delden NL, under the designation Servoxyl VPDZ 6/100.

Bone-china Powder

A bone-china powder available from Jesse Shirley & Sons Ltd., Stoke-on-Trent, GB, containing about 50% bone ash, about 25% kaolinic clays and 25% quartz and feldspar and with an averaae grain size of 4,8 µm.

Binding Agent S

A binding agent containing methyl silicone resin with a softening temperature of 70° C. and a viscosity of 2.500 mPa-s at 130° C., produced by Bayer AG, Germany, available under the designation Bayceram PIM VPAI 3588. Binding agent S has a softening temperature of 94–100° C., a density at 25° C. of 0.97 g/ml and a viscosity of about 2,000 mPa-s at 130° C.

EXAMPLE 1

To 1.95 kg water there were gradually added 10.35 kg bone-china powder in the form of moist filter cake (residual moisture 3.5%) in order to produce a viscous suspension. The suspension was stirred for 30 minutes. Subsequently 200 g of a 50% solution of dispersant A in water were added dropwise with constant stirring. The suspension was stirred for a further 30 minutes and then dried on metal sheets for 12 h at 50° C. and for 6 h at 120° C.

In a twin-screw extruder, Model ZSK 25 manufactured by Werder und Pfleiderer, Stuttgart, Germany, 8.4 kg coated ceramic powder were blended with 1.6 kg thermoplastic binding agent S and granulated upon emerging from the extruder. The extruder was operated at a temperature of 110° C., with a screw speed of 120 rpm and a throughput of 15 kg/h.

The molding composition was homogeneous and had good processing characteristics. The viscosity of the composition was measured at 130° C. in a capillary rheometer manufactured by Göttfert. The results are summarised in Table 1.

The mixture was processed by means of thermoplastic injection molding to form porcelain cups of high quality. Injection molding was performed using a cylinder temperature of 160° C., a mold temperature of 60° C., a holding-pressure time of 4 s at 250 bar and a cycle time of 30 s. After removal of the binding agent at temperatures up to 400° C. and sintering at 1,230° C., cups of high quality were obtained. In particular molding of the rim and handle was flawless.

EXAMPLE 2

As in Example 1, a suspension of 10.35 kg bone-china powder in the form of filter cake was processed with 1.85 kg water to form a suspension. Then 300 g of a 50% solution of dispersant A in water was admixed and the powder was dried.

In a twin-screw extruder 8.4 kg coated ceramic powder were blended with 1.6 kg thermoplastic binding agent S and granulated upon emerging from the extruder.

The molding composition homogeneous and had good processing characteristics. The viscosity of the composition was measured at 130° C. in a capillary rheometer. The results are summarised in Table 1.

The composition was processed by of thermoplastic injection molding to give porcelain cups of high quality. After removal of the binding agent at temperatures up to 400° C. and sintering at 1,230° C., cups of high quality were obtained. In particular molding of the rim and handle was flawless.

EXAMPLE 3

As in Example 1, a suspension of 10.35 kg bone-china powder in the form of filter cake was processed with 1.85 kg water to form a suspension. Then 400 g of a 25% solution of dispersant B in water were admixed and the powder was dried.

In a twin-screw extruder 8.4 kg coated ceramic powder were blended with 1.6 kg thermoplastic binding agent S and granulated upon emerging from the extruder.

The molding composition was homogeneous and had good processing characteristics. The viscosity of the composition was measured at 130° C. in a capillary rheometer. The results are summarised in Table 1.

The composition was processed by thermoplastic injection molding to form porcelain cups of high quality. After removal of the binding agent at temperatures up to 400° C. and sintering at 1,230° C., cups of high quality were obtained. In particular the molding of rim and handle was flawless.

COMPARATIVE EXAMPLE 4

As in Example 1, 8.4 kg uncoated bone-china powder were blended with 1.6 kg binding agent S in an extruder and granulated.

The molding compound was macroscopically homogeneous, but during the viscosity measurement in the capillary rheometer an uneven flow was observed which can be attributed to insufficient desagglomeration of the powder aggregates.

Due to the high viscosity, the composition could not readily be processed by thermoplastic injection molding. Production of porcelain cups without flaws was not possible. The injection-molded cups exhibited flawed molding of the rim and handle.

COMPARATIVE EXAMPLE 5

As in Comparative Example 4, 8.3 kg uncoated bone-china powder were blended with 1.7 kg binding agent S in an extruder and granulated.

The molding composition was macroscopically homogeneous, and during the viscosity measurement in the capillary rheometer a calm flow was observed.

Due to the high viscosity, the composition could only be processed with difficulty by of thermoplastic injection molding. Production of porcelain cups was possible, but after removal of the binding agent and subsequent sintering the injection-molded cups exhibited flawed molding of the rim and handle. In particular, cracks on the cup rim and handle were repeatedly observed upon removal of the binding agent.

EXAMPLE 6

As in Example 1, a suspension of 2.5 kg bone-china powder in the form of filter cake was processed with 1.0 kg water to form a suspension. Then 100 g of a 25% solution of a non-neutralized 50:50 mixture of polyether-substituted phosphoric acid esters (Servoxyl DZ 6/100) of the formula

$$(HO)_2P(O)[(OCH_2CH_2)_6OC_{10}H_{21})]$$

and

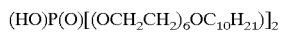
$$(HO)P(O)[(OCH_2CH_2)_6OC_{10}H_{21})]_2$$

in water were admixed and the powder was dried.

In a dough mixer 262 g coated ceramic powder were blended with 50 g thermoplastic binding agent S (16% binder) for 30 minutes at 120° C. and subsequently granulated.

The molding composition was homogeneous and had good processing characteristics. The viscosity of the composition was measured at 130° C. in a capillary rheometer. The result is summarised in Table 2.

COMPARATIVE EXAMPLE 7

As in Example 6, a suspension of 2.5 kg bone-china powder in the form of filter cake was processed with 1.0 kg water to form a suspension. Then 100 g of a 25% solution of Triton® X-405, an octylphenol ethoxylate available from Union Carbide Corp., in water were admixed and the powder was dried.

In a dough mixer 262 g coated ceramic powder were blended with 50 g thermoplastic binding agent S (16% binder) for 30 minutes at 120° C. and subsequently granulated.

The molding composition was homogeneous. The viscosity of the composition was measured at 130° C. in a capillary rheometer. The result is summarised in Table 2. The viscosity of the composition was slightly lower than that for compounds with uncoated ceramic powder but clearly higher than that for compositions with ceramic powder coated in accordance with the invention.

COMPARATIVE EXAMPLE 8

As in Example 7, a suspension of 2.5 kg bone-china powder in the form of filter cake was processed with 1.0 kg water to form a suspension. Then 100 g of a 25% solution of Tergitol® 7, sodium heptadecylsulfate available from Union Carbide Corp., in water were admixed and the powder was dried.

In a dough-mixer 262 g coated ceramic powder were blended with 50 g thermoplastic binding agent S (16% binder) for 30 minutes at 120° C. and subsequently granulated.

The molding composition was homogeneous. The viscosity of the composition was measured at 130° C. in a capillary rheometer. The result is summarised in Table 2. The viscosity of the composition was also higher than that for compositions with ceramic powder coated in accordance with the invention.

TABLE 1

Viscosity of the molding compositions

| Example | Dispersant | Wt-% Binding agent | Viscosity* at 5/s in Pa.s | Viscosity* at 100/s in Pa.s | Remarks |
|---|---|---|---|---|---|
| 1 | 1% disp. A | 16% | 4341 | 721 | calm flow |
| 2 | 1.5% disp. A | 16% | 3694 | 592 | calm flow |
| 3 | 1% disp. B | 16% | 3660 | 647 | calm flow |
| 4# | none | 16% | 16830 | 1108 | uneven flow |
| 5# | none | 17% | 6244 | 713 | calm flow |

*at 130° C. with shear velocity in 1/s
Comparative Examples

TABLE 2

Viscosity of the molding compositions

| Example | Dispersant | Wt-% Binding agent | Viscosity* in Pa.s at 100/s |
|---|---|---|---|
| 6 | 1% Servoxyl DZ 6/100 | 16% | 642 |
| 7# | 1% Triton X-405 | 16% | 818 |
| 8# | 1% Tergitol 7 | 16% | 858 |

*at 130° C. and shear velocity in 1/s
Comparative Examples

I claim:

1. Thermoplastic molding compositions containing at least one coated clay-containing ceramic powder and at least one thermoplastic binding agent, wherein the ceramic powder is coated with at least one polyether-substituted phosphoric ester, phosphonic ester, phosphonocarboxylic ester, a salt of one of said esters or a combination thereof.

2. Thermoplastic molding composition according to claim 1, containing in addition at least one silicone resin.

3. Thermoplastic molding composition according to claim 1, wherein the polyether-substituted phosphoric esters, phosphonic esters, phosphonocarboxylic esters or the salt thereof comprise at least one $C_4$ to $C_{40}$ aliphatic group.

4. Thermoplastic molding compositions according to claim 1, wherein the polyether-substituted phosphoric ester has the formula

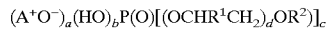
$$(A^+O^-)_a(HO)_bP(O)[(OCHR^1CH_2)_dOR^2)]_c$$

in which a ranges from 0 to 2.0 b ranges from 0 to 2.0 c ranges from 1.0 to 2.0 a+b lies between 1.0 and 2.0, a+b+c=3.0, d is 1 to 20, $A^+$ is $H_+$ or a alkali metal, alkaline metal of ammonium cation, $R^1$ is H or a methyl group and $R^2$ is a straight-chain or branched aliphatic group with 4 to 22 C atoms.

5. Thermoplastic molding compositions according to claim 1, wherein the polyether-substituted phosphonic ester has the formula

$$(A^+O^-)_aP(O)[(OCHR^1CH_2)_bOR^2]_c(R^3)$$

in which
- a ranges from 1.0 and 1.5,
- c ranges from 0.5 to 1.0
- a+c=2.0,
- b is 1 to 20,
- $A^+$ is $H^+$ or a alkali metal, alkaline metal or ammonium cation,
- $R^1$ is H or a methyl group,
- $R^2$ is a straight-chain or branched aliphatic group with 4 to 22 C atoms and
- $R^3$ is a straight-chain or branched aliphatic group with 1 to 22 C atoms.

6. Thermoplastic molding compositions according to claim 1, wherein the polyether-substituted phosphonocarboxylic ester has the formula

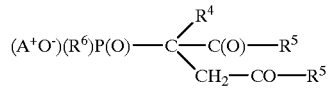

in which
- $A^+$ is $H^+$ or an alkali metal, alkaline metal or ammonium cation,
- $R^4$ is H or a straight-chain or branched, optionally substituted alkyl group with 1 to 22 C atoms and
- $R^5$ is a polyether-substituted ester group of the general formula

- b is 1 to 20,
- $R^1$ is H or a methyl group,
- $R^2$ is a straight-chain or branched aliphatic group with 4 to 22 C atoms and
- $R^6$ is —OH or $R^5$.

7. Process for the preparation of thermoplastic molding compositions according claim 1, wherein a suspension of at least one ceramic powder in water is blended with at least one polyether-substituted phosphoric ester, a phosphonic ester, a phosphonocarboxylic ester a salt of one of said esters on a combination thereof and subsequently dried and, subsequent thereto, blended with thermoplastic binding agent.

8. Process for the production of ceramic molded bodies which comprises shaping the thermoplastic molding composition according to claim 1, removing the binding agent by firing in contact with the air and sintering.

* * * * *